United States Patent [19]

Kaneko et al.

[11] Patent Number: 5,349,259
[45] Date of Patent: Sep. 20, 1994

[54] ROTOR FOR A PRINTED MOTOR

[75] Inventors: Toru Kaneko; Osamu Nakamura, both of Shizuoka, Japan

[73] Assignee: Minebea Co., Ltd., Nagano, Japan

[21] Appl. No.: 103,220

[22] Filed: Aug. 9, 1993

[30] Foreign Application Priority Data

Sep. 29, 1992 [JP] Japan .................... 4-284061

[51] Int. Cl.5 ........................................ H02K 1/22
[52] U.S. Cl. ........................... 310/261; 310/45; 310/268; 310/DIG. 6
[58] Field of Search ........... 310/268, 42, 261, DIG. 6, 310/43, 45, 198, 208

[56] References Cited

U.S. PATENT DOCUMENTS

| | | | |
|---|---|---|---|
| Re. 33,628 | 7/1991 | Hahn | 310/268 |
| 3,488,539 | 1/1970 | Tucker | 310/268 |
| 3,500,095 | 3/1970 | Keogh | 310/263 |
| 3,549,928 | 12/1970 | Knapp | 310/268 |
| 3,648,360 | 3/1972 | Tucker | 310/268 |
| 3,906,622 | 9/1975 | Sakano | 310/268 |
| 3,989,969 | 11/1976 | Lazaroiu | 310/263 |
| 4,949,002 | 8/1990 | Ibe | 310/268 |

Primary Examiner—R. Skudy
Attorney, Agent, or Firm—Oliff & Berridge

[57] ABSTRACT

In a rotor for a printed motor which has an armature, a hub fitted in the center of the armature and a rotating shaft supported by the hub, a cyanate resin is employed to impregnate a glass fabric forming an insulating sheet to which sheet coils are bonded together to form the armature. An insulating sheet of the same material is also interposed between the armature and the hub.

2 Claims, 4 Drawing Sheets

ROTOR FOR A PRINTED MOTOR

BACKGROUND OF THE INVENTION

1. Field of the Invention

This invention relates to a rotor which is suitable for use in making a printed motor having a small size and a flat shape and therefore a wide scope of applicability.

2. Description of the Prior Art

A printed motor is widely used, since it can be installed in a narrow space because of its small size and flat shape and yet can produce a large output. The steps of manufacturing a typical known printed motor are shown in FIGS. 3 and 4 of the accompanying drawings. A multiplicity of radially extending narrow slots 2 so shaped as to define parts of a coil are made in a thin steel sheet 1 to form a sheet coil 4 composed of a multiplicity of radially extending coil segments 3, as shown in FIG. 3. Two such sheet coils 4 are bonded together back to back with an insulating sheet 5 interposed therebetween, the central portion of the bonded assembly is cut away along a circular edge, and the inner ends of every pair of coil segments 3 facing each other are welded together as shown at 6 in FIG. 4. Then, the coils are bonded together with a similar insulating sheet 7 interposed therebetween, the outer portion of the bonded assembly is cut away along a circular edge beyond the coil segments 3, and the outer ends of every pair of coil segments 3 facing each other are welded together as shown at 8 in FIG. 4, whereby an armature 9 is formed. A hub is fitted in the center of the armature 9 with a similar insulating sheet interposed therebetween, and a rotating shaft is fitted to the hub, whereby a flat rotor is obtained.

It has, however, been usual to use glass fabrics impregnated with an epoxy resin as the insulating sheets. It has, therefore, been very likely that the deterioration of the resin may cause the rotor to be mechanically or electrically damaged when the printed motor is used at a high temperature. No measure has been taken to make a printed motor which can withstand use at a high temperature.

It is necessary to use insulating sheets having high resistance to heat to make a printed motor which can be used at a high temperature, or to which a large amount of electric current can be supplied. The known rotor has, however, the drawback that the resin which the insulating sheets contain is easily deteriorated by heat when the motor is used at a high temperature. The deterioration of the resin results in mechanical damage between the armature and the hub, or electrical damage, such as shortcircuiting between the upper and lower sheet coils. Therefore, the printed motor having the insulating sheets as hereinabove described in its rotor is incapable of use at a high temperature.

SUMMARY OF THE INVENTION

Under these circumstances, it is an object of this invention to provide an improved rotor which enables a printed motor to be used at a high temperature without being mechanically or electrically damaged.

This object is attained by a rotor comprising an armature formed by a pair of sheet coils bonded together with an insulating sheet interposed therebetween, the insulating sheet being a glass fabric impregnated with an electrically insulating resin, the sheet coils being electrically connected to each other at the inner and outer edges thereof, a hub fitted in the center of the armature, and a rotating shaft attached to the hub, characterized in that the resin is a cyanate resin.

A similar insulating sheet formed by impregnating a glass fabric with a cyanate resin may also be interposed between the armature and the hub.

The cyanate resin resists deterioration so as to enable a printed motor including the rotor of this invention to withstand use at a high temperature, or ensure that an improved heat resistance be maintained between the armature and the hub.

DETAILED DESCRIPTION OF THE INVENTION

Figure 2:
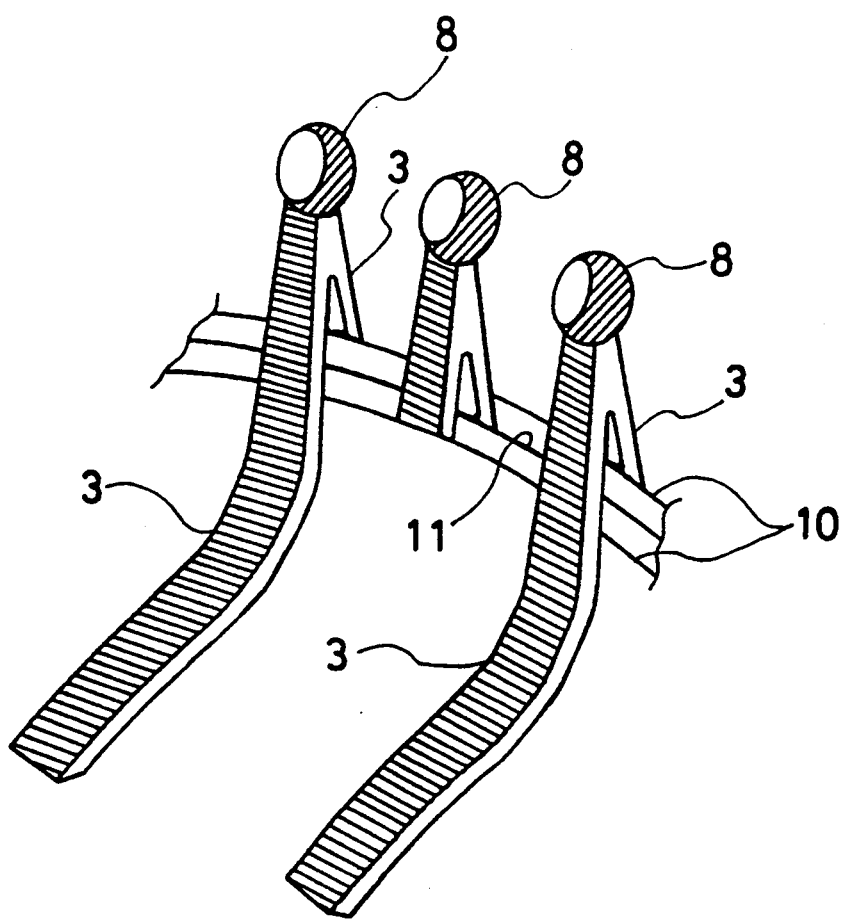
FIG. 2 is a fragmentary perspective view of the outer edges of sheet coils bonded together in the rotor shown in FIG. 1.
Figure 3:
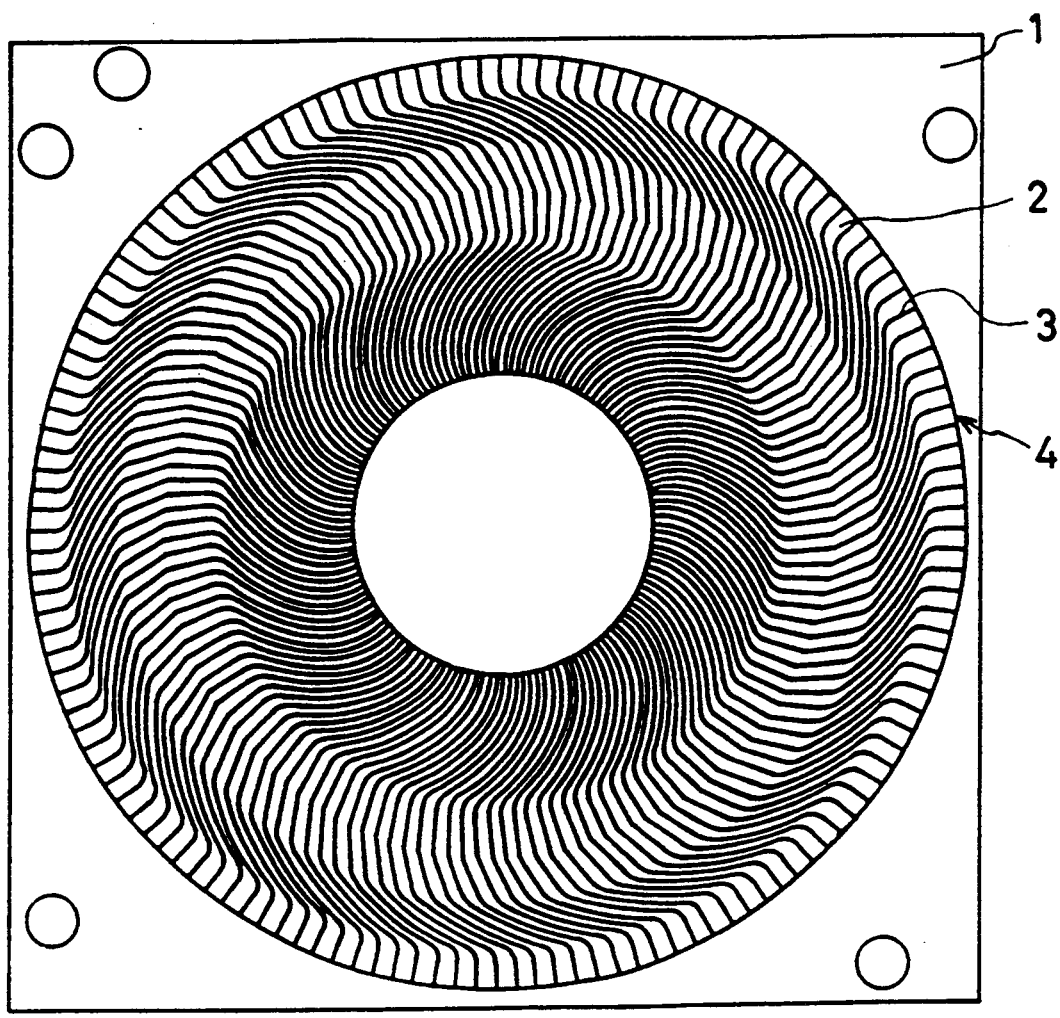
FIG. 3 is a top plan view of one of the sheet coils used to make an armature for the rotor.
Figure 4:
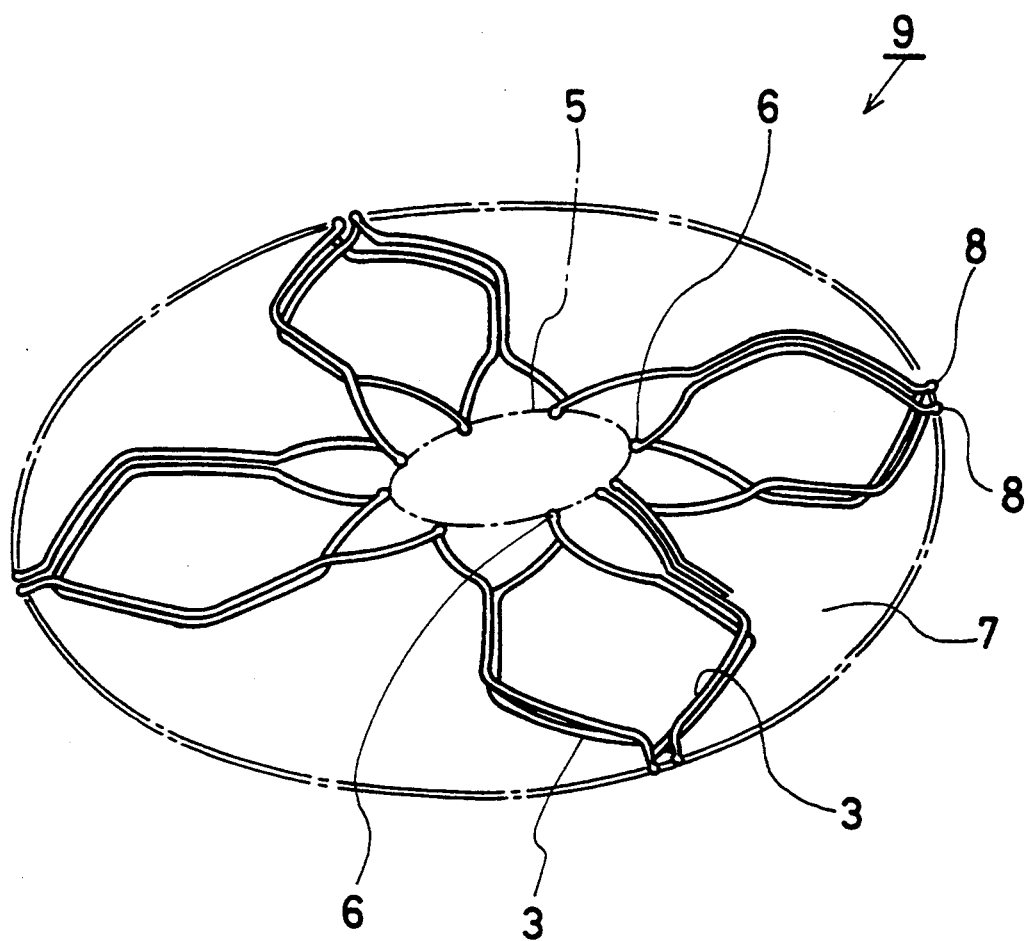
FIG. 4 is a perspective view of the sheet coils bonded together with insulating sheets interposed therebetween.

Description will now be made of a rotor embodying this invention with reference to FIGS. 1 and 2, as well as FIGS. 3 and 4 which have already been referred to for describing the manufacture of the known rotor. Like numerals are used to denote like parts throughout all of these figures.

The rotor embodying this invention is described in accordance with the process by which it is manufactured. A multiplicity of radially extending narrow slots 2 defining parts of a coil are made in a thin steel sheet 1 to form a sheet coil 4 composed of a multiplicity of radially extending coil segments 3, as shown in FIG. 3. Two such sheet coils 4 are bonded together back to back with an insulating sheet 10 interposed therebetween, as shown in FIG. 1. The insulating sheet 10 is of a glass fabric impregnated with a cyanate resin modified by a cresolnovolak epoxy resin. The central portion of the bonded assembly is cut away along a circular edge, and the inner ends of every pair of coil segments 3 facing each other are welded together as shown at 6 in FIGS. 1 and 2.

Figure 1:
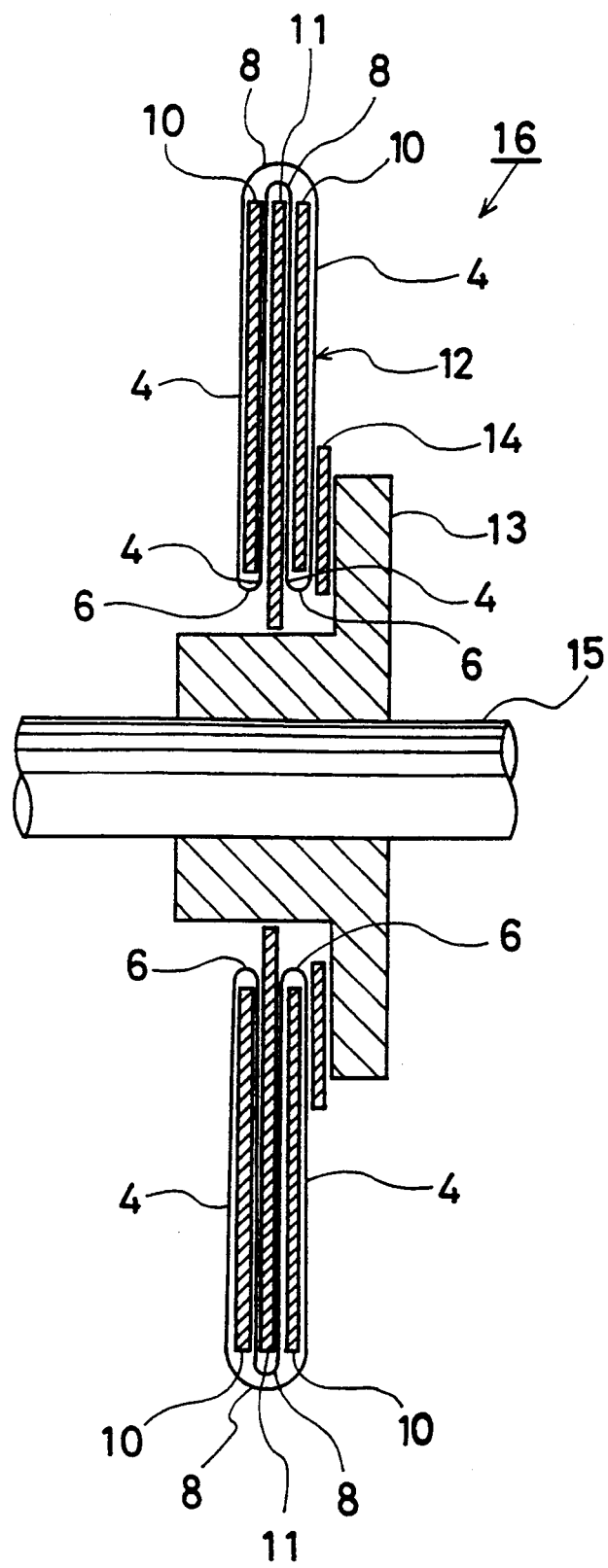
FIG. 1 is a schematic elevational view, partly in section, of a rotor embodying this invention.

Two such coil assemblies are bonded together with an insulating sheet 11 interposed therebetween, as shown in FIG. 1. The insulating sheet 11 is of the same material as the insulating sheet 10. The outer portion of the bonded assembly is cut away along a circular edge beyond the sheet coils 4, and the outer ends of every pair of coil segments 3 facing each other are welded together as shown at 8 in whereby an armature 12 is formed. The welded joints 8 are made between the coil segments 3 of the outer sheet coils 4 located outwardly of the insulating sheets 10, and between those of the inner sheet coils 4 located inwardly of the insulating sheets 10, as shown in FIG. 1 or 2. A hub 13 is fitted in the center of the armature 12 with an insulating sheet 14 interposed therebetween, and a rotating shaft 15 is fitted to the hub 13, whereby a flat rotor 16 is made, as shown in FIG. 1. The insulating sheet 14 is of the same material as the insulating sheets 10 and 11.

The invention will now be described with reference to examples of tests conducted to compare the rotors of this invention with known rotors.

EXAMPLE 1

A rotor 16 embodying this invention and containing an epoxy-modified cyanate resin in its insulating sheets 10, 11 and 14 (FIG. 1) as hereinabove described was compared with a known rotor containing an epoxy resin in its insulating sheets 5 and 7 (FIG. 4), etc. A shear torque was given to the joint between the armature 12 and the hub 13 in the rotor embodying this invention and the joint between the armature 9 and the hub in the known rotor at ordinary room temperature, and after the rotors had been heated to 150° C. or 200° C. These tests were conducted to see if and when the joint would be broken. The results are shown in TABLE 1 below. These results confirm the outstanding superiority of the rotor embodying this invention in the bonding strength of the joint at high temperatures and in the heat resistance of the insulating sheets employed therein.

TABLE 1

|  | At room temperature | At 150° C. | At 200° C. |
|---|---|---|---|
| Known rotor | Not broken even by a torque of 160 lbf · ft | Broken by a torque of 40 lbf · ft | — |
| Rotor of the invention | Not broken even by a torque of 160 lbf · ft | Not broken even by a torque of 160 lbf · ft | Not broken even by a torque of 160 lbf · ft |

EXAMPLE 2

A maximum of 50 cycles of a thermal shock tests were conducted on two rotors 16 embodying this invention as hereinabove described and two known rotors of the type as hereinabove described. Each cycle consisted of giving the rotor a thermal shock between −25° C. and 150° C., and applying a shear torque of 50 lbf.ft to the joint between the armature and the hub to see if and when the joint would be broken. The results are shown in TABLE 2 below, and confirm the outstanding superiority of the rotors of this invention in bonding strength and in the heat resistance of the insulating sheets employed therein.

TABLE 2

| Known rotors | (1) Broken in the second cycle of test |
|---|---|
|  | (2) Broken in the sixth cycle of test |
| Rotors of the invention | (1) Not broken even in the 50th cycle of test |
|  | (2) Not broken even in the 50th cycle of test |

EXAMPLE 3

Two rotors 16 embodying this invention and two known rotors were employed to make printed motors. The motors were continuously driven at a speed of 1400 rpm by applying a voltage of 17 V, while the armatures were kept at a temperature of 200° C. This test was conducted to see if and when the motors would be broken. The results are shown in TABLE 3, and confirm the outstanding durability at a high temperature of the printed motors including the rotors of this invention.

TABLE 3

| Known rotors | (1) Broken after 520 hours of operation |
|---|---|
|  | (2) Broken after 310 hours of operation |
| Rotors of the invention | (1) Not broken even upon passage of 2000 hours |
|  | (2) Not broken even upon passage of 2000 hours |

As is obvious from the foregoing description, the cyanate resin with which the insulating sheets in the rotor of this invention are impregnated does not undergo deterioration at any high temperature that the printed motor may reach. Therefore, the rotor of this invention does not have any mechanical damage between the armature and the hub, or any electrical damage, such as shortcircuiting between the adjoining sheet coils, even at a high temperature, but makes it possible to provide a printed motor having an improved level of durability at a high temperature.

Moreover, the armature, or rotor of this invention has an improved corrosion resistance owing to the gas of the cyanate resin which rises from the insulating sheets and adheres to the surfaces of the sheet coils when the sheet coils are bonded to the insulating sheets under heat and pressure.

What is claimed is:

1. In a rotor for a printed motor comprising:
   an armature formed by electrically connecting an outer end and an inner end of a sheet coil that is formed by heat-pressure bonding sheet coils having a coil pattern respectively on both sides of an insulating board including a glass fabric impregnated with an electrically insulating cyanate resin;
   a hub fitted in the center of said armature;
   a rotating shaft supported by said hub; and
   an insulator located between said armature and said hub, said insulator including a glass fabric impregnated with cyanate resin.

2. A rotor as set forth in claim 1, wherein said cyanate resin is modified with an epoxy resin.

* * * * *